United States Patent Office 3,706,564
Patented Dec. 19, 1972

3,706,564
PROCESS FOR FORMING SILVER HALIDE CRYSTALS IN THE PRESENCE OF AMPHIPHILIC COPOLYMERS
Kenneth Robert Hollister, Pittsford, Ernest John Perry, Rochester, and Glen Marshall Dappen, Webster, N.Y., assignors to Eastman Kodak Company, Rochester, N.Y.
No Drawing. Filed Oct. 28, 1970, Ser. No. 84,920
Int. Cl. G03c 1/04
U.S. Cl. 96—114
6 Claims

ABSTRACT OF THE DISCLOSURE

Copolymers are disclosed which are soluble in aqueous media, as well as in organic solvents. In one aspect, these polymers comprise (1) units of (N,N-dialkylamino)alkyl acrylates and (2) units of alkyl acrylates. In another aspect, silver halide grains are formed in the presence of amphiphilic polymers in an aqueous medium, coagulated and then redispersed in an organic solvent for coating on a support.

---

This invention relates to improved processes for preparing silver salts and to certain polymers useful in preparing said silver salts. In one aspect, this invention relates to a process wherein a silver salt is prepared in an aqueous dispersion in the presence of a polymeric compound and is subsequently dispersed in a non-aqueous medium. In another aspect, this invention relates to a new class of copolymers wherein said copolymer consists essentially of recurring units of (N,N-dialkylamino)alkyl acrylates and alkyl acrylates.

It is known in the art to prepare silver halide salts in an aqueous medium in the presence of synthetic polymers, such as described in Priest et al., U.S. Pat. 3,003,879, Smith et al., U.S. Ser. No. 701,084 filed Jan. 29, 1968, now Pat. No. 3,615,624, and Belgian Pat. 561,161 granted Oct. 15, 1957. Generally, the polymeric peptizers used in the preparation of the silver salt are sufficiently soluble in aqueous media to prevent clumping of the silver grains. However, in many instances, the peptizer is not soluble in organic media and the peptized silver halide could be coagulated by the addition of organic solvents such as disclosed in Belgian Pat. 561,161. In certain instances where the polymeric peptizers were soluble in water and could be redispersed after the precipitation in a non-aqueous medium, it was found that they were quite limited in application to certain emulsion-making conditions. Improved systems are desirable which would provide wide latitude with respect to silver salt preparation environment.

We have now found a multisolvent system for preparing silver salt dispersions which can be used to produce photographic silver salt dispersions under a wide variety of conditions such as single-run procedures, double-run procedures, procedures using ripening agents, procedures using controlled pH and pAg and the like. Generally, we have found that when a polymeric peptizer, such as a copolymer comprising units of (N,N-dialkylamino)alkyl acrylate with units of alkyl acrylates and optionally with units of ethylenically unsaturated monomers having thioether moieties in groups appended thereto, is used in the precipitation medium of the silver salt, silver can be precipitated in aqueous or non-aqueous solvent media, and after coagulation it can be redispersed in either aqueous or non-aqueous media.

In a highly preferred embodiment according to this invention, the silver salt is precipitated in the presence of said polymeric peptizer in an aqueous medium and is subsequently coagulated and redispersed in a non-aqueous medium such as an organic solvent.

In another preferred embodiment, said polymeric peptizer comprises from 0 to 20 mole percent of units of an ethylenically unsaturated monomer containing groups appended thereto comprising at least one thioether moiety, from about 35 to 75 mole percent of units of an alkyl acrylate and from 25 to 65 mole percent of a (N,N-dialkylamino)alkyl acrylate.

In another embodiment, this invention relates to new compositions of matter which are copolymers consisting essentially of units of (N,N-dialkylamino)alkyl acrylates and units of alkyl acrylates.

The copolymers which have been found to be very useful in systems in accordance with this invention generally contain units of (N,N-dialkylamino)alkyl acrylates. It is understood, of course, that when the term "acrylates" is used herein, it is used generally to include methacrylates and the like. Typical preferred compounds of this type are represented by the formula:

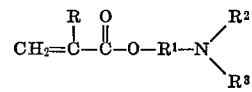

wherein R is a hydrogen atom or a methyl group; $R^1$ is an alkylene group preferably containing from 1 to 8 carbon atoms, including branched-chain alkylene groups such as methylene, ethylene, propylene, trimethylene, butylene, isobutylene and the like; and $R^2$ and $R^3$ are alkyl groups of from 1 to 6 carbon atoms, including branched-chain alkyl groups, aryl groups of from 6 to 15 carbon atoms such as phenyl, substituted phenyl, naphthyl and the like.

In a highly preferred embodiment wherein the silver salts are prepared in an aqueous medium and then subsequently redispersed in a non-aqueous medium, the polymeric peptizer comprises units of 2-(N,N-dimethylamino)ethyl methacrylate.

The alkyl acrylates used in making the copolymers of this invention are generally referred to as unsubstituted acrylic esters (which form hydrophobic units when polymerized) and, of course, include the alkyl methacrylates, as well as the alkyl acrylates. Typical useful acrylic esters include methyl acrylate, ethyl acrylate, propyl acrylate, butyl acrylate, isopropyl acrylate, isobutyl acrylate, t-butyl acrylate, respective methacrylates, and the like. Preferably, the alkyl acrylate is a simple compound such as methyl acrylate or methyl methacrylate.

The polymeric peptizers of this invention can also comprise units of an ethylenically unsaturated compound comprising groups having thioether moieties or sulfide-sulfur atoms therein. In a preferred embodiment, these compounds include those derived from monomers of amides and esters of ethylenically unsaturated acids, including maleic acids, acrylic acids, methacrylic acids and the like, in which the respective amine and alcohol condensation residues in said amides and esters contain at least one organic group having at least one sulfide-sulfur atom linking two methylene groups (—$CH_2$—). Typical units of this type useful in certain embodiments according to this invention are disclosed in U.S. Ser. No. 701,084 filed Jan. 29, 1968, which is incorporated herein by reference. These units can be obtained from monomers such as:

N-(3-thiabutyl)acrylamide;
N-(3-thiapentyl)acrylamide;
N-(4-methyl-2-thiapentyl)acrylamide;
N-(2,5-dimethyl-4-thiahexyl)acrylamide;
N-(5-thiaheptyl)acrylamide;
N-(4-thiaheptyl)acrylamide;
N-(6-methyl-4-thiaheptyl)acrylamide;
N-(3-thiaoctyl)acrylamide;
N-(7-thianonyl)acrylamide;
N-(6-ethyl-2-methyl-4-thiaoctyl)acrylamide;

N-(6-thia-2,4,9-trimethyldecyl)acrylamide;
N-(4-thiadodecyl)acrylamide;
3-thiapentyl acrylate;
Bis(2-thiabutyl)methyl acrylate;
methylthioethyl acrylate; and
methacryloylpropylmethionine methyl ester.

In accordance with this invention, silver halide grains can be formed in the presence of amphiphilic polymers which are silver halide peptizers. Generally, the silver halide grains can be formed in the presence of either aqueous or non-aqueous media, coagulated and then redispersed in either aqueous or non-aqueous media. In highly preferred embodiments, the silver halide grains are formed in the presence of an aqueous medium by conventional techniques with the amphiphilic polymer present, coagulated and then redispersed in an organic solvent. The process of the invention is very useful in preparing silver chloride, silver bromide, silver iodide, silver bromoiodide, silver chlorobromoiodide, etc., emulsions or mixtures thereof. The emulsions can be coarse-grain or fine-grain and can be prepared by single-jet techniques, double-jet techniques and optionally in the presence of ripening agents such as ammonium, thiocyanates, thioethers, etc., such as emulsions described in U.S. Pats. 2,222,264 by Nietz et al., 3,320,069 by Illingsworth, 3,271,157 by McBride, 2,592,250 by Davey et al., 3,367,778 by Berriman, 3,447,927 by Bacon et al., and the like.

The non-aqueous medium is generally an organic solvent medium. The term "organic solvent" generally refers to those compounds comprising carbon and hydrogen atoms which generally have boiling points below 165° C. and preferably lower than about 90° C. In certain preferred embodiments of this invention, the amphiphilic polymers are soluble in organic solvents such as alcohols, ketones, amides, nitriles, ethers including the cyclic ethers, and the like. Other solvents such as organic acids, organic sulfoxides and organic sulfones can also be used, including mixtures of any of the above organic solvents. Typical useful organic solvents include acetone, dimethylformamide, methyl alcohol, ethyl alcohol, n-propyl alcohol, isopropyl alcohol, dioxane, dimethylsulfoxide, sulfolane, acetonitrile, tetrahydrofuran, dimethylacetamide, 1,2-dimethoxyethane, acetic acid, triethylamine, and the like. Preferably, the organic solvents used in dispersing the amphiphilic polymers are water-miscible, especially if an aqueous medium is used for either the silver halide grain formation or the redispersion.

The silver halide emulsions prepared and/or redispersed according to this invention can be washed by any of the appropriate techniques known in the art. Moreover, the resulting photographic emulsions can be coated by those methods which are useful in the art, including dip coating, air knife coating, curtain coating, extrusion coating and the like, with the addition that methods used for organic-solvent coating can also be utilized.

The resulting emulsions prepared by this invention containing the amphiphilic copolymers can be utilized in much the same way as those emulsions in the photographic art. They can be chemically or spectrally sensitized, coated with antifoggants, or coated with developing agents; the emulsions can be hardened; binder vehicles can be added thereto including water-soluble polymers, latex polymers, water-insoluble polymers, natural substances such as proteins, and the like; plasticizers, lubricants, coating aids, matting agents and brighteners can be coated therewith or in adjacent layers; also they can generally be chemically processed or developed by techniques used in the art, including dry development techniques.

The term "amphiphilic" is, of course, understood to characterize compounds having both polar water-soluble and hydrophobic water-insoluble groups wherein the compound can be put into a stable water solution and also into a stable organic solvent solution. The amphiphilic polymers of this invention can be characterized as being at least 3% soluble, by weight, in water, which has been adjusted to a pH of less than five, at room temperature and at least 3%, by weight, soluble in an organic solvent. Preferably, the amphiphilic polymers are at least 3% soluble in acetone.

The interpolymers of this invention can be generally polymerized by solution polymerization, emulsion polymerization or bulk polymerization procedures, but they are preferably polymerized by solution polymerization procedures. The polymerization is carried out to obtain a molecular weight of the interpolymer of at least about 10,000 to about 500,000 and preferably from about 30,000 to about 100,000. The inherent viscosities of the interpolymers generally range from about 0.1 to about 2.

The invention can be further illustrated by the following examples of preferred embodiments thereof.

EXAMPLE 1

Aqueous and non-aqueous silver salt peptization with a copolymer of 3-thiapentyl acrylate, methyl methacrylate and 2-(N,N-dimethylamino)ethyl methacrylate (mole ratio 1:5:4)

A flask is charged with 8.0 g. of 3-thiapentyl acrylate, 25.0 g. of methyl methacrylate, 31.4 g. of 2-(dimethylamino)ethyl methacrylate, 0.32 g. of 2,2'-azobis(2-methylpropionitrile) and 260 ml. of acetone. It is swept for 10 minutes with nitrogen and placed in a 60° C. bath overnight under a reflux condenser. The polymeric product is precipitated and washed in water, following which it is dried under evacuation without heating. A yield of 53.8 g. of a tough white polymer is obtained.

Anal. for $C_{64}H_{112}O_{20}N_4S$.—Calcd. (percent) C, 59.6; H, 8.8; N, 4.3; S, 2.4. Found (percent): C, 59.9; H, 8.8; N, 4.5; S. 2.2.

The inherent viscosity of this polymer is 0.38 determined at 0.25 g./100 ml. solution at 25° C. in acetone.

A 5.0-g. sample of this polymer dissolved in 300 ml. of water at pH 5.3 is treated with 32.8 g. of potassium bromide and 1.0 g. of potassium iodide. The system is stirred continuously at 70° C. as a solution of 38.2 g. of silver nitrate in 190 ml. of water is added at a constant rate over a 30-minute period. The silver halide suspension thus formed is cooled to room temperature where it remains smoothly dispersed.

A 50-g. sample of the aqueous silver halide dispersion is treated with enough dilute sodium hydroxide to raise its pH to 7.8. The dispersion immediately coagulates, forming a precipitate which settles into a pad in the bottom of the vessel. After about 30 minutes, the clear aqueous supernatant is decanted, leaving a firm pad of precipitate. The pad is treated with about 45 ml. of acetone and stirred. A smooth, homogeneous dispersion is immediately formed. The experiment is repeated using other organic solvents. Smooth, homogeneous dispersions are similarly formed in dimethylformamide, methyl alcohol, ethyl alcohol, n-propyl alcohol, isopropyl alcohol, dioxane, dimethylsulfoxide, acetonitrile, tetrahydrofuran, dimethylacetamide and 1,2-dimethoxyethane.

EXAMPLE 2

Aqueous and non-aqueous silver salt peptization with a copolymer of methyl methacrylate and 2-(N,N-dimethylamino)ethyl methacrylate (mole ratio 1:1)

A flask is charged with 50.00 g. of methyl methacrylate, 78.50 g. of 2-(N,N-dimethylamino)ethyl methacrylate, 0.64 g. of 2,2'-azobis(2-methylpropionitrile) and 520 ml. of acetone. The system is purged with nitrogen for 10 minutes and placed in a 60° C. bath overnight. The polymeric product is precipitated and thoroughly washed in a large excess of distilled water. About half of the moist white polymeric precipitate is dried under vacuum at 40° C. The resulting polymer has an inherent viscosity in acetone of 0.33.

*Analysis.*—Calculated for $C_{13}H_{23}O_4N$: 60.6% C, 9.0% H, 5.4% N. Found: 60.5% C, 9.2% H, 5.7% N.

The second half of the moist precipitate is dissolved in water by the slow addition of sulfuric acid with stirring. The resulting polymer dope contains 6.0% solids and has a pH of 5.5.

A sample of the above dope is used to prepare a silver halide dispersion in essentially the same manner as that described in Example 1.

A 50-ml. sample of the dispersion is treated with enough dilute sodium hydroxide to raise its pH to 7.8. The dispersion immediately coagulates, forming a precipitate which settles into a pad at the bottom of the vessel. After a few minutes, the clear aqueous supernatant is decanted, leaving a firm pad of precipitate. The pad is then treated with enough acetone to bring the system back to its original volume and stirred. A smooth, homogeneous dispersion is immediately formed.

EXAMPLE 3

A single-run emulsion is prepared in the presence of a copolymer of 3-thiapentyl acrylate, methyl methacrylate and 2-(N,N-dimethylamino)ethyl methacrylate (mole ratio 1:5:4).

A silver bromoiodide (94:6) negative emulsion peptized by the above-mentioned copolymer and made in a manner similar to the type of emulsion described by Trivelli and Smith (Phot. J., vol. 79, p. 330) is prepared. After formation of the silver halide grains, separation from the soluble salts is accomplished by coagulation of the emulsion grains by means of a pH adjustment to pH 7.8 (using sodium hydroxide solution), removal of the supernatant liquid by siphoning, and redispersion of the silver halide grains in a dilute sulfuric acid solution (pH=5.5). Repetition of the coagulation-siphoning-redispersion cycle yields an emulsion which consists of well-dispersed grains with diameters within the 0.4–1.0µ range.

Although the invention has been described in considerable detail with particular reference to certain preferred embodiments thereof, variations and modifications can be effected within the spirit and scope of the invention.

We claim:

1. A process of forming water-insoluble silver halide crystals comprising introducing the respective silver and halide reactants into a liquid medium comprising an amphiphilic polymeric compound consisting of from 25 to 65 mole percent of units of an (N,N-dialkylamino) alkyl acrylate, from about 35 to 75 mole percent of units of an alkyl acrylate, and up to 20 mole percent of units of an ethylenically unsaturated monomer containing groups appended thereto comprising at least one thioether moiety; said amphiphilic polymeric compound being characterized as being at least 3% soluble, by weight, in water, which has been adjusted to a pH of less than 5, at room temperature and at least 3%, by weight, soluble in an organic solvent.

2. A process according to claim 1 wherein said silver salt formed in said liquid medium is then coagulated, decanted and redispersed in an organic liquid.

3. A process according to claim 1 wherein said silver salt is formed in an aqueous medium.

4. A process of precipitating a silver halide salt comprising (1) introducing the respective silver and halide reactants into an aqueous medium comprising an amphiphilic copolymer consisting of from 25 to 65 mole percent of units of an (N,N-dialkylamino) alkyl acrylate, from about 35 to 75 mole percent of units of an alkyl acrylate, and up to 20 mole percent of units of an ethylenically unsaturated monomer containing groups appended thereto comprising at least one thioether moiety, (2) coagulating the solids out of the liquid medium, (3) removing the aqueous liquid and (4) redispersing said solids in an organic liquid; said amphiphilic copolymer being characterized as being at least 3% soluble, by weight in water, which has been adjusted to a pH of less than 5, at room temperature and at least 3%, by weight, soluble in an organic solvent.

5. A process according to claim 4 wherein said organic liquid is a water-miscible liquid selected from alcohols, ketones, amines, nitriles, amides, ethers, cyclic ethers, acids, sulfoxides and sulfones.

6. A process according to claim 4 wherein said organic liquid has a boiling point of less than about 90° C.

References Cited

UNITED STATES PATENTS 3,084,132   4/1963   Shashoua _____ 96—114

FOREIGN PATENTS 889,760   2/1962   Great Britain _____ 96—114

RONALD H. SMITH, Primary Examiner

U.S. Cl. X.R.

96—94 R; 260—86.1